(12) United States Patent
Turek et al.

(10) Patent No.: US 8,002,399 B2
(45) Date of Patent: Aug. 23, 2011

(54) SOLID INKS INCORPORATING A POLYHYDROXYALKANOATE COMPOUND FOR ENHANCED PROPERTIES

(75) Inventors: Caroline M. Turek, Mississauga (CA); Gwynne Evelyn McAneney Lannen, Waterdown (CA); C. Geoffrey Allen, Waterdown (CA); Everett Alan Ness, Lake Oswego, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/629,411

(22) Filed: Dec. 2, 2009

(65) Prior Publication Data

US 2011/0130502 A1 Jun. 2, 2011

(51) Int. Cl.
*C09D 11/10* (2006.01)
(52) U.S. Cl. ...... 347/99; 347/88; 106/31.29; 106/31.61; 524/599; 523/160; 523/161
(58) Field of Classification Search ............ 106/31.4, 106/31.29, 31.61; 524/39, 599; 347/88, 347/99; 523/160, 161
See application file for complete search history.

(56) References Cited

U.S. PATENT DOCUMENTS

| | | | |
|---|---|---|---|
| 4,830,671 A | 5/1989 | Frihart et al. |
| 4,889,560 A | 12/1989 | Jaeger et al. |
| 4,889,761 A | 12/1989 | Titterington et al. |
| 5,122,187 A | 6/1992 | Schwarz et al. |
| 5,194,638 A | 3/1993 | Frihart et al. |
| 5,195,430 A | 3/1993 | Rise |
| 5,231,135 A | 7/1993 | Machell et al. |
| 5,372,852 A | 12/1994 | Titterington et al. |
| 5,389,958 A | 2/1995 | Bui et al. |
| 5,496,879 A | 3/1996 | Griebel et al. |
| 5,534,616 A | 7/1996 | Waddington |
| 5,597,856 A | 1/1997 | Yu et al. |
| 5,621,022 A | 4/1997 | Jaeger et al. |
| 5,782,966 A | 7/1998 | Bui et al. |
| 6,015,847 A | 1/2000 | Titterington et al. |
| 6,174,937 B1 | 1/2001 | Banning et al. |
| 6,221,137 B1 | 4/2001 | King et al. |
| 6,309,453 B1 | 10/2001 | Banning et al. |
| 6,380,423 B2 | 4/2002 | Banning et al. |
| 6,464,766 B1 | 10/2002 | Banning et al. |
| 6,521,429 B2 | 2/2003 | Honma et al. |
| 6,547,380 B2 | 4/2003 | Smith et al. |
| 6,620,228 B1 | 9/2003 | King et al. |
| 6,858,070 B1 | 2/2005 | Wong et al. |
| 6,860,930 B2 | 3/2005 | Wu et al. |
| 6,906,118 B2 | 6/2005 | Goodbrand et al. |
| 7,186,762 B2 | 3/2007 | Wong et al. |
| 2005/0228168 A1 | 10/2005 | Kinoshita et al. |
| 2005/0239998 A1 | 10/2005 | Kinoshita et al. |
| 2006/0105440 A1 | 5/2006 | Kinoshita et al. |
| 2006/0247390 A1 * | 11/2006 | Whitehouse et al. ......... 525/450 |
| 2007/0120911 A1 * | 5/2007 | Wu et al. ......................... 347/88 |
| 2008/0145558 A1 * | 6/2008 | Banning ...................... 427/466 |
| 2008/0297556 A1 | 12/2008 | Turek et al. |
| 2008/0299627 A1 | 12/2008 | Kang et al. |

FOREIGN PATENT DOCUMENTS

GB 2 238 792 A 6/1991
WO WO 95/020614 8/1995

* cited by examiner

*Primary Examiner* — David Wu
*Assistant Examiner* — Vu A Nguyen
(74) *Attorney, Agent, or Firm* — Oliff & Berridge, PLC

(57) ABSTRACT

A solid phase change ink composition that includes at least one colorant and an ink vehicle. The ink vehicle further includes at least one polyhydroxyalkanoate compound of the below formula

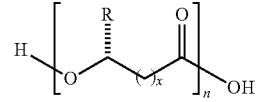

wherein R is independently selected from the group consisting of a hydrogen atom, a hydrocarbon group, a heteroatom, and combinations thereof, and wherein n represents the number of repeating units of from 1 to about 35,000, and wherein x represents an integer from 1 to about 5.

13 Claims, No Drawings

SOLID INKS INCORPORATING A POLYHYDROXYALKANOATE COMPOUND FOR ENHANCED PROPERTIES

BACKGROUND

Phase change inks (sometimes referred to as "solid inks" and "hot melt inks") have been used in various liquid deposition techniques. Phase change inks often contain a "phase change agent" that enables the ink to exist in a solid phase at ambient temperatures, but also exist in the liquid phase at the elevated operating temperature of an ink jet printing device. At the deposit operating temperature, droplets of liquid ink are ejected from the printing device and, as the ink is jetted towards or contacts the surface of the recording substrate, either directly or via an intermediate heated transfer belt or drum, the ink quickly solidifies to form a predetermined pattern of solidified ink drops. Phase change inks have also been used in other printing technologies, such as gravure printing, as disclosed in, for example, U.S. Pat. No. 5,496,879 the disclosure which is incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink, filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In general, phase change inks are in the solid phase at, for example, ambient or room temperature, such as about 20° C. to about 27° C., but exist in the liquid phase at the elevated operating temperature of an ink jet printing device. At the jet operating temperature, the ink is molten and droplets of liquid ink are ejected from the printing device.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, that is, there is a small translation of the printhead with respect to the substrate in between each rotation. This approach simplifies the printhead design, and the small movements ensure good droplet registration.

Hot melt inks typically used with ink jet printers have a wax based ink vehicle, for example, a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

However, the use of crystalline waxes places limitations on the printed image. Conventional crystalline waxes are apolar aliphatic molecules bound together by weak van der Waals forces. These waxes have little natural affinity for the more polar paper substrate and due to the nature of their own intermolecular bonding are vulnerable to mechanical damage.

U.S. Pat. No. 6,906,118, incorporated herein by reference in its entirety, discloses phase change ink compositions wherein at a first temperature, hydrogen bonds of sufficient strength exist between the ink vehicle molecules so that the ink vehicle forms hydrogen bonded dimers, oligomers, or polymers, and wherein at a second temperature higher than the first temperature, the hydrogen bonds between the ink vehicle molecules are sufficiently broken that fewer hydrogen-bonded dimers, oligomers, or polymers are present in the ink so that the viscosity of the ink at the second temperature is lower than the viscosity of the ink at the first temperature.

Solid inks are considered to be an environmentally-conscious way to print due to the cartridge free design, minimal packaging, nearly waste-free printing process and safe, toxin free solid ink sticks. However, solid inks may also cause certain problems such as (1) increased accumulation in greenhouse gases and/or accumulation of non-biodegradable materials and (2) ink shrinkage (the purging of excess ink) caused by formation of air bubbles jet lines. These issues may be due to presence of petroleum-based products such as waxes in the solid ink, which can lead to poor abrasian resistance, poor adhesion and poor fold resistance. While present phase change inks are very useful for their intended purposes, it is desirable to provide a solid phase change ink wherein a major proportion of the ink is derived from renewable resources, and is thus environmentally friendly.

SUMMARY

What is still desired is a solid ink containing a compound that reduces or eliminates the amount of petroleum-based products in the solid ink, improves ink shrinkage issues, and reduces the accumulation of greenhouse gases and/or non-biodegradable materials. Such a solid ink would thus be suitable for all processes and/or devices using solid inks.

The above and other issues are addressed by the present application, wherein in embodiments, the application relates to a solid phase change ink composition comprising at least one colorant, and an ink vehicle including at least one polyhydroxyalkanoate compound of Formula 1

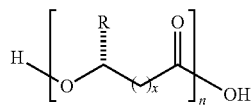
(1)

wherein R is independently selected from the group consisting of a hydrogen atom, a hydrocarbon group, a heteroatom, and combinations thereof, wherein n represents the number of repeating units of from 1 to about 35,000, and wherein x represents an integer from 1 to about 5.

In embodiments, described is a solid phase change ink composition comprising at least one colorant, and an ink vehicle including at least one branched triamide, a monoamide, an isocyanate derived material, a triglyceride of hydrogenated abietic acid and at least one polyhydroxyalkanoate compound of Formula 1

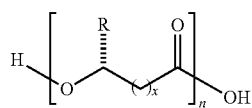
(1)

wherein R is independently selected from the group consisting of a hydrogen atom, a hydrocarbon group, a heteroatom, and combinations thereof, wherein n represents the number of repeating units of from 1 to about 35,000, wherein x represents an integer from 1 to about 5, and wherein the at least one polyhydroxyalkanoate compound is a homopolymer or co-polymer comprised of at least one moiety selected from the group consisting of 3-hydroxypropionate, 3-hydroxybutyrate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxyundecanoate, 3-hydroxydodecanoate, and combinations thereof, and the at least one moiety has a same or different number of repeating units.

In embodiments, described is an ink jet device comprising at least one ink retaining reservoir holding a phase change ink, an ink jet head, and an ink supply line for providing the phase change ink to the ink jet head, wherein the phase change ink comprises at least one colorant and an ink vehicle including at least one polyhydroxyalkanoate compound of Formula 1

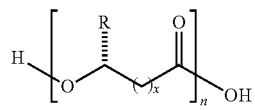
(1)

wherein R is independently selected from the group consisting of a hydrogen atom, a hydrocarbon group, a heteroatom, and combinations thereof, wherein n represents the number of repeating units of from 1 to about 35,000, and wherein x represents an integer from 1 to about 5.

EMBODIMENTS

Described herein is a solid phase change ink composition that includes at least one colorant and an ink vehicle. The ink vehicle further includes at least one polyhydroxyalkanoate compound of the below formula

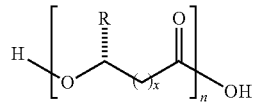
(1)

wherein R is independently selected from, the group consisting of a hydrogen atom, a hydrocarbon group, a heteroatom, and combinations thereof, and wherein n represents the number of repeating units of from 1 to about 35,000, and wherein x represents an integer from 1 to about 5.

In this regard, all of the inks suitable for use may be characterized as low energy inks. Low energy inks are solid at a temperature below about 40° C. and have a shear rate viscosity of from about 5 to about 15 centipoise (cP), for example from about 10 to about 15 cP, about 12 to about 15 cP and about 14 to about 15 cP at a jetting temperature of from about 80° C. to about 150° C., for example from about 90° C. to about 130° C. or from about 110° C. to about 120° C. at a shear rate of about 80 $s^{-1}$ to 120 $s^{-1}$.

The ink vehicle of the present disclosure contains at least one polyhydroxyalkanoate (PHA) compound. In embodiments, the at least one polyhydroxyalkanoate compound may be represented by Formula 1

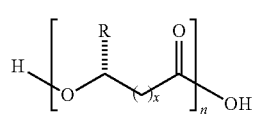
(1)

wherein R can be a hydrogen atom, a hydrocarbon group, a heteroatom, n is the number of repeating units of from 1 to about 35,000, such as from about 2 to about 30,000, from about 5 to about 10,000, from about 5 to about 8,000, from about 5 to about 2,000, from about 5 to about 1,000, from about 8 to about 500, from about 10 to about 200 or from about 10 to about 75; x is the number of repeating methyl units of from 1 to about 5, such as from 1 to about 4, from 2 to about 4 or from 1 to about 3.

Unless otherwise indicated, in identifying the substituents for R, the phrase "hydrocarbon group" encompasses both unsubstituted hydrocarbon groups and substituted hydrocarbon groups. The hydrocarbon group can be a saturated or an unsaturated hydrocarbon group. The unsubstituted hydrocarbon group may contain, for example, from 1 to about 20 carbon atoms, from 1 to about 15 carbon atoms, from 1 to about 15 carbon atoms and from 1 to about 13 carbon atoms, and may be linear, branched or cyclic. Examples of the unsubstituted hydrocarbon groups may include, for example, a straight chain alkyl group, a branched alkyl group, a cycloalkyl group, an aryl group, an alkylaryl group, an arylalkyl group, straight chain alkenyl group, a branched alkenyl group. The unsubstituted hydrocarbon groups may also a branched or straight chain alkyne. Example alkyl groups may include, for example, methyl, ethyl, propyl, butyl, pentyl, hexyl, heptyl, octyl, nonyl, decyl, undecyl, dodecyl, tridecyl, tetradecyl, pentadecyl, cyclopentyl, cyclohexyl, cycloheptyl, and isomeric forms thereof.

The substituted hydrocarbon group may contain, for example, from 1 to about 25 carbon atoms, from 1 to about 15 carbon atoms, from 1 to about 15 carbon atoms, and from about 1 to about 13 carbon atoms, with one or more carbon atoms substituted with, for example, fluorine, bromine, chlorine, iodine, sulfur, amino, nitro, hydroxyl, cyano, alkoxy, or combinations thereof. The substituted portion of the substituted hydrocarbon groups may be, for example, a straight chain alkyl group, a branched alkyl group, a cycloalkyl group, an aryl group, an alkylaryl group, an arylalkyl group with a heteroatom, a straight chain alkenyl group, a branched alkenyl group. The substituted hydrocarbon groups may also a branched or straight chain alkyne. Example alkyl groups may include, for example, methyl, ethyl, propyl, butyl, pentyl, hexyl, heptyl, octyl, nonyl, decyl, undecyl, dodecyl, tridecyl, tetradecyl, pentadecyl, cyclopentyl, cyclohexyl, cycloheptyl, and isomeric forms thereof. In embodiments, the hydrocarbon group may be optionally substituted alkyl and optionally substituted aryl.

Unless otherwise indicated, in identifying the substituents for R, the term "heteroatom" includes hydrogen, fluorine, bromine, chlorine, iodine, sulfur, nitrogen, oxygen, or combinations thereof. Further, the heteroatom can be a single atom such as, for example, chlorine or fluorine or the single atom contained in a compound such as, for example, the nitrogen atom (N) in an amino compound ($NH_2$) and the sulfur atom (S) in a $SO_2$ compound.

PHA polymer compounds are natural polyester materials that may be manufactured inside the cells of bacteria grown in high densities. The PHA compounds may be present in an amount of 90% dry weight in the bacteria cells. Furthermore, the polyhydroxyalkanoate may be a fermentation product, particularly of a microbiological process, whereby a microorganism lays down polyhydroxyalkanoate during normal or manipulated growth. Manipulation may be achieved by removing or failing to provide one or more nutrients necessary for cell multiplication. The microorganisms may be wild type or mutated or may have the necessary genetic material introduced into it, for example by any of the methods of recombinant DNA technology. It is to be emphasized that it is not necessary for the polyhydroxyalkanoate-producing organism to be a microorganism, but at present such organisms are preferred.

The basic structure of PHAs consists mainly of repeating monomeric units of hydroxyalkanoates (HA). The hydroxyl group of one monomer is attached to the carboxyl group of another monomer by an ester bond to form a long chain type polyester accumulation. Examples of polyhydroxalkanoate compounds include those described in U.S. Pat. Nos. 5,534,616, 6,521,429, U.S. Patent Application Pub. No. 2008/0299627, and WO 1995020614, each of which are incorporated herein by reference in their entirety. Co-polymers of PHA's comprise at least two randomly repeating monomer units (RRMU). For example, the general structure of a PHA co-polymer may be comprised of a first RRMU having the general structure

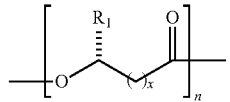

and a second RRMU having the general structure

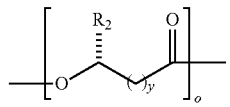

wherein $R_1$ and $R_2$ are independently selected from the group consisting of a hydrogen atom, a hydrocarbon group, heteroatom, and combinations thereof, and wherein n and o independently represent the number of repeating units of from 1 to about 35,000, and wherein x and y independently represent an integer from 1 to about 5. Additional RRMUs, such as containing three, four, five, six, etc., RRMU's may also be included in the PHA such that they have the same or different number of repeating units.

PHAs are enormously versatile, and as many as 100 different PHA structures have been identified. PHA structures can vary in two ways. First, PHAs can vary according to the structure of the pendant groups, which are typically attached to a carbon atom having (D)-stereochemistry. The pendant groups form the side chain of hydroxyalkanoic acid not contributing to the PHA carbon backbone. Second, PHAs can vary according to the number and types of their repeat units. These variations in PHA structure can cause variations in their physical characteristics. These physical characteristics make PHAs useful for a number of products that may be commercially valuable.

For example, PHAs may be classified by this second method according to the type of alkyl group in the C3 or β-position. For example, in the above Formula 1, if x is 1 and R is hydrogen, the PHA is poly(3-hydroxypropionate) ("P(3HP)"), if x is 1 and R is a methyl group, the PHA is poly(3-hydroxybutyrate) ("P(3HB)"), if x is 1 and R is an ethyl group, the PHA is poly(3-hydroxyvalerate) ("P(3HV)"), if x is 1 and R is a propyl group, the PHA is poly(3-hydroxycaproate) ("P(3HC)"), if x is 1 and R is a butyl group, the PHA is poly(3-hydroxyheptanoate) ("P(3HH)"), if x is 1 and R is a pentyl group, the PHA is poly(3-hydroxyoctanoate) ("P(3HO)"), if x is 1 and R is a hexyl group, the PHA is poly(3-hydroxynonanoate) ("P(3HN)"), if x is 1 and R is a heptyl group, the PHA is poly(3-hydroxydecanoate) ("P(3HD)"), if x is 1 and R is an octyl group, the PHA is poly(3-hydroxyundecanoate) ("P(3HUD)"), if x is 1 and R is a nonyl group, the PHA is poly(3-hydroxydodecanoate) ("P(3HDD)"). Further, in the above Formula 1, if x is 2 and R is a hydrogen atom, the PHA is poly(4-hydroxybutyrate) ("P(4HB)"), if x is 2 and R is a methyl group, the PHA is poly(4-hydroxyvalerate) ("P(4HV)"), if x is 3 and R is hydrogen, the PHA is poly(5-hydroxyvalerate) ("P(5HV)").

In embodiments, the polyhydroxyalkanoate compound is a homopolymer or co-polymer comprised of at least one moiety selected from the group consisting of 3-hydroxypropionate, 3-hydroxybutyrate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxyundecanoate, 3-hydroxydodecanoate, and combinations thereof.

The polyhydroxyalkanoate compound may be comprised of from 1 to about 15 polyhydroxyalkanoate monomers. The polyhydroxyalkanoate compound may be present in a copolymer, terpolymer, or a copolymer containing more than 3 chemically distinct monomers in any desired number of polyhydroxyalkanoate monomers. Examples of the poly(3-hydroxyalkanoate) copolymer include copolymers of 3-hydroxybutyrate and another hydroxyalkanoate having 3 to 12 carbon atoms. Examples of the additional polyhydroxyalkanoate compounds include (3-hydroxybutyrate)-(3-hydroxypropionate) copolymer, (3-hydroxybutyrate)-(3-hydroxypropionate)-(4-hydroxybutyrate) copolymer, (3-hydroxybutyrate)-(3-hydroxyvalerate) copolymer, (3-hydroxybutyrate)-(3-hydroxyvalerate)-(3-hydroxyhexanoate)-(3-hydroxyheptanoate) copolymer, (3-hydroxybutyrate)-(3-hydroxyvalerate)-(3-hydroxyhexanoate)-(3-hydroxy-heptanoate)-(3-hydroxyoctanoate) copolymer, (3-hydroxybutyrate)-(3-hydroxyhexanoate)-(3-hydroxyoetanoate) copolymer, (3-hydroxypropionate)-(3-hydroxyvalerate)-(3-hydroxyhexanoate)-(3-hydroxyheptanoate)-(3-hydroxyoctanoate)-(3-hydroxynonanoate)-(3-hydroxydecanoate) copolymer, (3-hydroxypropionate)-(3-hydroxybutyrate)-(3-hydroxyvalerate)-(3-hydroxyheptanoate)-(3-hydroxy-octanoate) copolymer, (3-hydroxybutyrate)-(3-hydroxyvalerate)-(3-hydroxyhexanoate)-(3-hydroxyheptanoate)-(3-hydroxyoctanoate)-(3-hydroxynonanoate)-(3-hydroxydecanoate)-(3-hydroxyundecanoate)-(3-hydroxydodecanoate) copolymer, (3-hydroxybutyrate)-(4-hydroxybutyrate) copolymer, and combinations thereof.

Additional examples of the poly(3-hydroxyalkanoate) copolymer include copolymers of 3-hydroxyheptoate and another hydroxyalkanoate having 3 to 12 carbon atoms. Examples include (3-hydroxyheptoate)-(3-hydroxypropionate) copolymer, (3-hydroxyheptoate)-(3-hydroxypropionate)-(4-hydroxybutyrate) copolymer, (3-hydroxyheptoate)-(3-hydroxyvalerate) copolymer, (3-hydroxyheptoate)-(3-hydroxyvalerate)-(3-hydroxyhexanoate) copolymer, (3-hydroxybutyrate)-(3-hydroxyvalerate)-(3-hydroxyhexanoate)-(3-hydroxy-heptanoate)-(3-hydroxyoctanoate) copolymer, (3-hydroxybutyrate)-(3-hydroxyhexanoate)-(3-hydroxyheptoate) copolymer, (3-hydroxypropionate)-(3-hydroxyvalerate)-(3-hydroxyhexanoate)-(3-hydroxyheptanoate)-(3-hydroxyoctanoate)-(3-hydroxynonanoate)-(3-hydroxydecanoate) copolymer, (3-hydroxyheptoate)-(3-hydroxyoctanoate) copolymer, (3-hydroxyheptoate)(3-hydroxynonanoate) copolymer, and (3-hydroxyheptanoate)-(3-hydroxydecanoate) copolymer, and combinations thereof.

Methods for producing PHA are described in U.S. Patent Application Pubs. Nos. 2005/0228168, 2006/0105440 and 2005/0239998, each of which are incorporated by reference herein in their entirety. Specifically, one such method for producing PHA in a plant involving genetically manipulating the plant to produce in its peroxisomes at least two enzymes in the PHA biosynthetic pathway. The plants comprise in their genomes at least two stably incorporated DNA constructs, each DNA construct comprising a coding sequence for an enzyme involved in PHA synthesis operably linked to a promoter that drives the expression of a gene in a plant. Such plants are then genetically manipulated to produce a PHA synthase (also known as a PHA polymerase) that catalyzes polymer synthesis. The PHA synthase catalyzes the synthesis of copolymers, such as copolymers comprised of 3-hydroxybutanoic acid monomers and at least one additional monomer or copolymers comprised of 3-hydroxybutanoic acid monomers and at least one additional monomer having a hydroxyacyl-chain length of from 1 to about 25 carbon atoms, from about 2 to about 20 carbon atoms and from about 5 to about 18 carbon atoms. Examples of PHA synthases include PHA synthases encoded by nucleotide sequences isolatable from *Pseudomonas oleovorans* (GenBank Accession No. M58445, SEQ ID NO: 8), *Pseudomonas putida* (GenBank Accession No. AF042276, SEQ ID NO: 9), *Pseudomonas aeruginosa* (EMBL Accession No. X66592, SEQ ID NO: 10), *Aeromonas caviae* (DDBJ Accession No, D88825, SEQ ID NO: 11), and *Thiocapsa pfennigii* (EMBL Accession No. A49465, SEQ ID NO: 12). The preferred PHA synthases additionally include the PHA synthases encoded by nucleotide sequences isolatable from *Pseudomonas fluorescens*.

The polyhydroxyalkanoate compound may be present in the ink in any desired amount, typically from about 0.5 to about 20 percent by weight of the ink vehicle or ink vehicle mixture, for example from about 1 to about 15 percent by weight of the ink vehicle or ink vehicle mixture, from about 2 to about 10 percent by weight of the ink vehicle or ink vehicle mixture, from about 2 to about 8 percent by weight of the ink vehicle or ink vehicle mixture or from about 4 to about 7 percent by weight of the ink vehicle or ink vehicle mixture.

In embodiments, due to the polar nature of the polyhydroxyalkanoate compound in the ink vehicle, the inclusion of the polyhydroxyalkanoate compound in the ink vehicle is intended to (1) increase the robustness and enhance the cohesion of the phase change ink composition while in a solid state and (2) reduce the total number of total components and amount of petroleum components in the ink vehicle. This increased robustness is evident as the solid ink did not shatter, but merely deformed, upon being subjected to various stresses.

Additional materials may also be included in the ink vehicle. Examples of suitable materials can include microcrystalline waxes, polyethylene waxes, ester waxes, long chain acids with at least 30 carbons, fatty acids, fatty amides, ethylene/propylene copolymers, urethane derivatives of oxidized synthetic or petroleum waxes, n-paraffinic hydrocarbons, branched paraffinic hydrocarbons, naphthenic hydrocarbons, highly branched hydrocarbons, ethoxylated alcohols, linear alcohols, hydrocarbon-based waxes, modified maleic anhydride hydrocarbon adducts of polyolefins prepared by graft copolymerization, mixtures of monoamides, diamides, triamides and tetraamides, and mixtures thereof.

One type of ink vehicle may include n-paraffinic or branched paraffinic compounds, and/or contain aromatic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Petrolite.

Highly branched hydrocarbons, typically prepared by olefin polymerization, such as the VYBAR materials available from Petrolite, including VYBAR 253 (Mn=520), VYBAR 5013 (Mn=420), and the like, may also be used. In addition, the ink vehicle may be an ethoxylated alcohol, such as available from Baker Petrolite and of the general formula

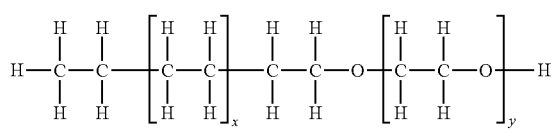

wherein x is an integer of from about 1 to about 50, such as from about 5 to about 35 or from about 11 to about 23 and y is an integer of from about 1 to about 70, such as from about 1 to about 50 or from about 1 to about 40. The materials may have a melting point of from about 50° C. to about 150° C., such as from about 60° C. to about 120° C. or from about 70° C. to about 110° C. and a molecular weight ($M_n$) range of from about 100 to about 5,000, such as from about 500 to about 3,000 or from about 500 to about 2,500. Commercial examples include UNITHOX 420 ($M_n$=575), UNITHOX 450 ($M_n$=920), UNITHOX 480 ($M_n$=2,300), UNITHOX 520 ($M_n=^{700}$), UNITHOX 550 ($M_n$=1,100), UNITHOX 720 ($M_n$=875), UNITHOX 750 ($M_n$=1,400), and the like.

As an additional example, mention may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Chemtura Corporation and CRODAMIDE S available from Croda, behenamide/arachidamide, such as CRODAMIDE BR available from Croda, oleamide, such as KEMAMIDE U available from Chemtura Corporation and CRODAMIDE OR available from Croda, technical grade oleamide, such as KEMAMIDE OR available from Chemtura Corporation, CRODAMIDE O available from Croda, and UNISLIP 1753 available from Uniqema, and erucamide such as KEMAMIDE E Ultra available from Chemtura Corporation, derived from a vegetable source, and CRODAMIDE ER available from Croda, are some examples of suitable primary amides. Stearyl stearamide, such as KEMAMIDE S-180 available from Chemtura Corporation, stearyl erucamide, such as KEMAMIDE E-180 available from Chemtura Corporation and CRODAMIDE 212 available from Croda, oleyl palmitamide, such as KEMAMIDE P-181 available from Chemtura Corporation and CRODAMIDE 203 available from Croda, and erucyl stearamide, such as KEMAMIDE S-221 available from Chemtura Corporation, are some examples of suitable secondary amides. Additional suitable amide materials include, CRODAMIDE VRX, a refined vegetable oleamide available from Croda, CRODAMIDE SRV, a refined vegetable stearamide available from Croda and derived entirely from GM-free vegetable feedstock, CRODAMIDE EBO, an ethylene bis-oleamide available from Croda and KEMAMIDE W20 (N,N'-ethylenebisoleamide) Desirable Crodamide products are those derived from vegetable based materials (High Erucic Rapeseed Oil) such as: CRODAMIDE E, CRODAMIDE ER, CRODAMIDE VRX, CRODAMIDE SRV, CRODAMIDE BR, CRODAMIDE 203, CRODAMIDE 212, CRODAMIDE EBO, and optionally CRODAMIDE EBSV, an ethylene bis-stearamide.

Additional examples of suitable ink vehicles for the phase change inks include polyamides; dimmer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as diphenyl sulfone, n-amyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

Further materials may be included in the ink vehicle of the phase change ink composition, such as high molecular weight linear alcohols, hydrocarbon-based waxes, and modified maleic anhydride hydrocarbon adducts of polyolefins prepared by graft copolymerization.

High molecular weight linear alcohols, such as those available from Baker Petrolite and of the general formula

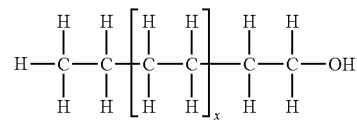

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

Examples of hydrocarbon-based waxes include homopolymers of polyethylene available from Baker-Petrolite and of the general formula

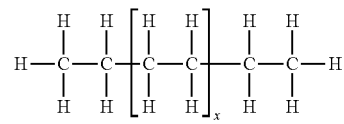

wherein x is an integer of from about 1 to about 200, such as from about 5 to about 150 or from about 12 to about 105. The melting point of the polyethylene wax may be from about 50° C. to about 130° C. from about 60° C. to about 120° C., from about 70° C. to about 110° C., from about 70° C. to about 105° C., and from about 80° C. to about 90° C. Further, the polyethylene wax may be present in the ink in any amount, such as, for example at least 10% to about 95% by weight of the ink carrier, at least about 15% to about 80% by weight of the ink carrier, at least about 25% to about 70% by weight of the ink carrier, at least about 30% to about 70% by weight of the ink carrier, and at least about 40% to about 65% by weight of the ink carrier.

Examples of suitable specific ink vehicles include, for example, ethylene/propylene copolymers, such as those available from Petrolite and of the general formula

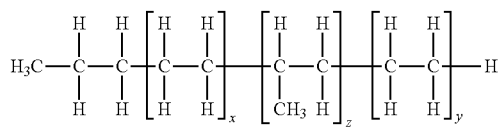

wherein z represents an integer from 0 to about 30, for example from 0 to about 20 or from 0 to about 10, y represents an integer from 0 to about 30, for example from 0 to about 20 or from 0 to about 10 and x is equal to about 21-y. The distribution of the side branches may be random along the carbon chain. The copolymers may have, for example, a melting point of from about 70° C. to about 150° C., such as from about 80° C. to about 130° C. or from about 90° C. to about 120° C. and a molecular weight range of from about 500 to about 4,000. Commercial examples of such copolymers include, for example, Petrolite CP-7 (Mn=650), Petrolite CP-11 (Mn=1,100, Petrolite CP-12 (Mn=1,200) and the like.

Urethane, urea, amide and imide derivatives of oxidized synthetic or petroleum waxes, such as those available from Petrolite and of the general formulas

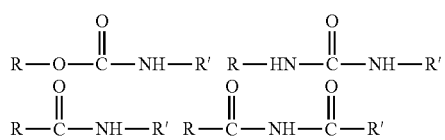

wherein R is an alkyl group of the formula $CH_3(CH_2)_n$, n is an integer of from about 5 to about 400, for example from about 10 to about 300 or from about 20 to about 200 and R' is a tolyl group, may also be used as the ink vehicle. In embodiments, the urethane, urea, amide and imide derivatives may be linear, branched, cyclic and any combination thereof. These materials may have a melting point of from about 60° C. to about 120° C., such as from about 70° C. to about 100° C. or from about 70° C. to about 90° C. Commercial examples of such materials include, for example, bis-urethanes such as PETROLITE CA-11®, PETROLITE WB-5® and PETROLITE WB-17®, all available from Baker Petrolite, and the like. Suitable examples also include urethane, urea, amide and imide derivatives disclosed in U.S. Pat. Nos. 6,620,228, 6,380,423, 6,464,766 and 6,309,453, each of which is incorporated herein by reference.

Another example includes modified maleic anhydride hydrocarbon adducts of polyolefins prepared by graft copolymerization, such as those available from Petrolite and of the general formulas

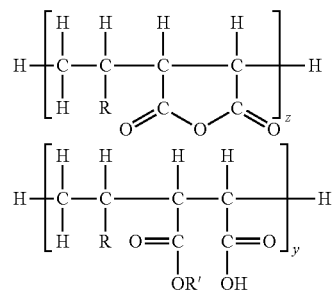

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; those available from Petrolite and of the general formula

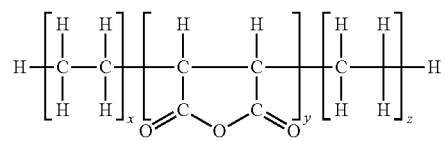

wherein x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from Petrolite and of the general formula

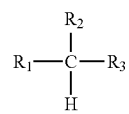

wherein $R_1$ and $R_3$ are hydrocarbon groups and $R_2$ is either of one of the general formulas

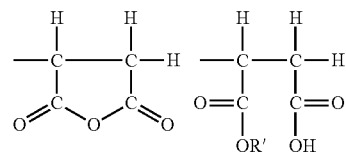

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of other additional materials that may be include in the ink carrier along with the polyhydroxyalkanoate compound described herein include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Durez Corporation; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bisricinoleamide), available from Vertellus and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink carrier materials.

In addition, the ink vehicles described in U.S. Pat. No. 6,906,118, incorporated herein by reference in its entirety, may also be used. Also suitable as ink vehicles are liquid crystalline materials as disclosed in, for example, U.S. Pat. No. 5,122,187, the disclosure of which is incorporated herein by reference in its entirety.

Additional resins and waxes may further be selected from the group consisting of a urethane resin obtained from the reaction of two equivalents of ABITOL® E hydroabietyl alcohol and one equivalent of isophorone diisocyanate, prepared as described in U.S. Pat. No. 5,782,966, the disclosure of which is totally incorporated herein by reference; a urethane resin that was the adduct of three equivalents of stearyl isocyanate and a glycerol base alcohol; prepared as described in Example 4 of U.S. Pat. No. 6,309,453 the disclosure of which is totally incorporated herein by reference; suitable amides including, for example, diamides, triamides, tetraamides, cyclic amides and the like. Fatty amides including monoamides, tetra-amides, and mixtures thereof, may also be included in the ink vehicle such as, for example, those described in U.S. Pat. Nos. 4,889,560, 4,889,761, 5,194,638, 4,830,671, 6,174,937, 5,372,852, 5,597,856, and 6,860,930 and British Patent No. GB 2 238 792, the entire disclosures of each are incorporated herein by reference; and those similar to what is described in U.S. Pat. No. 6,620,228, which is incorporated herein by reference in its entirety.

Further resins suitable for use herein include triamides. Triamides suitable for use herein include linear triamides, which are molecules where all three amide groups are drawn in the same molecular chain or branch. Examples of linear triamides include those triamides having the following formulas:

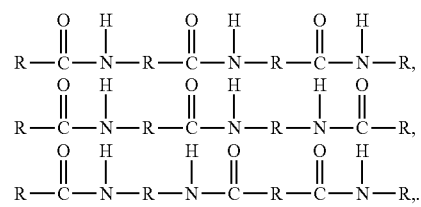

R can be any hydrocarbon having from about 1 to about 200, carbon atoms, such as from about 25 to 150 carbon atoms or from about 30 to about 100 carbon atoms.

Linear triamides can further include those wherein a line can be drawn through the three amide groups, even if one would ordinarily draw a different line. One example of such, a triamide can be expressed by the following formula:

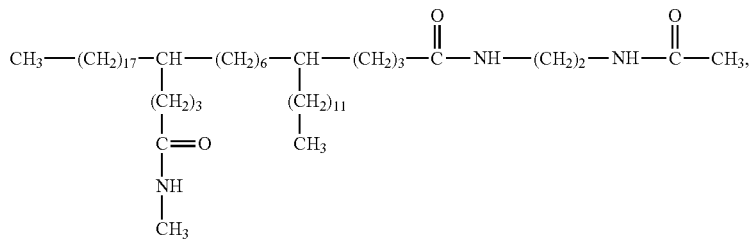

which can also be drawn as;

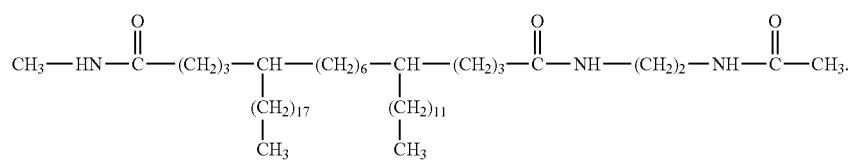

In embodiments, the triamide may also be a branched triamide. Examples of suitable branched triamides include those triamides disclosed in U.S. Pat. No. 6,860,930 and U.S. Patent Application Pub. No. 2008/0297556, each of which are incorporated herein in their entirety by reference. Any branched triamide disclosed in U.S. Pat. No. 6,860,930 and U.S. Patent Application Pub. No. 2008/0297556, is suitable for use herein.

The ink vehicle may comprise one or more of the aforementioned or the below mentioned suitable materials. As used herein, "one or more" and "at least one" refers to from 1 to about 10, such as from 1 to about 8 or from 1 to about 5 of any given feature disclosed herein.

The ink vehicle may comprise from about 60% to about 99.5% by weight of the ink, for example from about 70% to about 98% or from about 80% to about 95% by weight of the ink.

Many ink vehicles of phase change inks have an electrical conductivity of essentially zero. Thus, conductivity enhancing agents may be added to the ink vehicle in order to provide consistent conductivity to the ink. The conductivity is used as an input signal for a level sensor in the ink reservoir of the ink jet device.

Prior components of a phase change ink that may have contributed to the electrical conductivity if the phase change inks were colorants such as pigments and dyes, and dodecyl benzene sulfonic acid (DDBSA), as disclosed in U.S. Pat. No. 6,015,847, and incorporated herein by reference.

In embodiments, the conductivity enhancing agent is an organic salt formed from an organic base and an acid. The conductivity enhancing agent does not detrimentally affect any printer parts (for example, printheads or reservoirs of an ink jet device) as do other conductivity enhancing agents (for example, DDBSA).

The organic base of the organic salt of the conductivity enhancing agent may be an organic amine and have at least one long hydrocarbon chain. "Long hydrocarbon chain" refers to, for example, a linear or branched carbon alkyl or aryl chain having from about 10 carbons to about 50 carbons, such as from about 15 to about 40 carbons or from about 15 carbons to about 30 carbons. The long carbon chain of the organic salt allows it to be miscible in the ink vehicle.

Examples of organic bases that are suitable for use herein are derived from tertiary amine compounds having the following generic formula, which may include tri-hexadecyl amine (ARMEEN® 316, molecular weight 689).

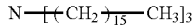

In embodiments the organic bases may be derived from trioctadecyl amine, tridodecyl amine, tritetradecyl amine, trieicosyl amine, tridocosylamine, tritetracosylamine, mixed forms like didodecyl octadecyl amine, didocosyl tetracosyl amine, ditetracosyl tetradecyl amine, and the like, and arylaliphatic compounds, such as di(1-decyl-4-nonyl-phenyl) docosyl amine:

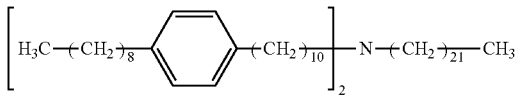

or 4-nonylphenyl dioctadecyl amine, as shown below:

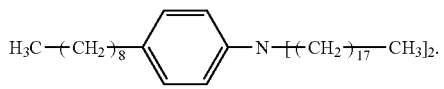

In embodiments, the organic base may be a primary, secondary or tertiary amine. An example of a suitable primary amine may be represented by the general formula

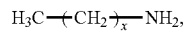

wherein x is an integer from about 1 to about 50, such as from about 10 to about 40 or from about 12 to about 30, for example, a hexadecyl amine. An example of a suitable secondary amine may be represented by the general formula

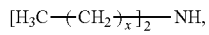

wherein x is an integer from about 1 to about 50, such as from about 10 to about 40 or from about 12 to about 30, for example, a di-octadecyl amine.

An acid reacts with the organic base described above to form the organic salt. Substituents in the acid anion with a high electronegativity, for example, fluorine atoms, are desirable in order to facilitate the reaction between acid and base and produce a large number of molecule anions and cations. These molecule anions and cations may act as carriers for the electrical charge in an applied outer electrical field. The substituents in the acid anion, when placed close enough to certain functional groups in the molecule, may pull electrons away from potentially acid O—H or C—H bonds. This allows for an easier separation of the positively charged hydrogen atoms (protons) from the remainder of the molecule. These mobile protons may then associate with the molecules of the base, and form molecular cations of this base. Thus, the presence of electronegative substituents in the molecules of the acid may tend to shift the equilibrium of neutral acids and bases towards charged species. In turn, these charged species may be the source for carriers having an electrical charge.

Another aspect is that the molecular ion of an acid suitable for use herein has a high mobility, thus enhancing the conductivity of the phase change ink. This high mobility may be achieved by using a small molecular ion. However, when small molecular ions are used, the solubility of the organic salt decreases. Thus, the size of the molecular ion must be sufficient to maintain the solubility of the organic salt in the phase change ink, while at the same time exhibiting sufficient mobility so as to enhance the conductivity of the phase change ink.

Examples of acid generated suitable molecular ions that may be used herein include the ions of acids such as trifluoroacetic acid, methane sulfonic acid and trifluoro methane sulfonic acid. Such acids may have a molecular weight from about 25 to about 250, such as from about 25 to about 225 or from about 50 to about 250 Daltons.

The estimated half life of the organic salt under a constant temperature of about 120° C. is from about 15 days to about 250 days, such as from about 20 days to about 225 days or from about 20 days to about 200 days.

The phase change ink disclosed herein may contain one organic salt, or a mixture of one or more suitable organic salts, for example from about 1 to about 10 organic salts, such as from about 1 to about 4 or from about 1 to about 2 organic salts. Each organic salt is present in the ink in any effective amount, for example from about 0.001 weight percent to about 8 weight percent, such as from about 0.1 weight percent to about 5 weight percent or from about 0.25 weight percent to about 5 weight percent of the ink.

The organic salt described herein imparts a high electrical conductivity to phase change inks by sufficiently dissociating into molecular ions with high ion mobility. Specifically, the organic salt will dissociate into ions, that is, anions and cations, to provide the phase change ink with high electrical conductivity during operation of an ink jet device.

The conductivity of the phase change ink having the conductivity enhancing agent therein may be from about 0.01 µS/cm to about 5 µS/cm, such as from about 0.05 µS/cm to about 4 µS/cm or from about 0.09 µS/cm to about 2.5 µS/cm. Conductivity may be measured by any known method, and herein is measured under melt conditions at about 120° C. by placing titanium electrodes in the molten ink and reading the resistivity output on a Rosemount Model 1054B LC Conductivity Meter at a frequency of 60 Hz. In general, the conductivity of a material can be measured in terms of the reciprocal of resistivity, which is a material specific and temperature dependent measurement for electrical resistance.

The organic salts disclosed herein are soluble in the non-polar organic environment of phase change inks, demonstrate thermal stability in phase change inks when an ink jet device is operating, are waxy solids at room temperature, may positively influence the mechanical durability of printed, solid inks, and do not etch or attack printer parts which may contact the organic salts found in the phase change inks.

The ink of embodiments may further include conventional additives to take advantage of the known functionality associated with such conventional additives. Such additives may include, for example, at least one isocyanate derived material, antioxidant, defoamer, UV adsorber, slip and leveling agents, clarifier, tackifier, adhesive, plasticizer and the like.

The ink carrier may also include at least one isocyanate derived material as a stabilizer material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier at least about 2% by weight of the ink carrier, such as for example from about 2 to about 99% by weight of the ink carrier, from about 2 to about 90% by weight of the ink carrier, from about 3 to about 80% by weight of the ink carrier, from about 5 to about 60% of the ink carrier, from abut 10 to about 50% by weight of the ink carrier, and from about 10 to about 30% by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12,840-6), (4) 2,2'-ethylidene bis (4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6 420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,9514), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl) benzoic acid (Aldrich 32,527-9), (30) ethyl-2-(4-(4-(trifluoromethyl)phenoxy)phenoxy)propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional tackifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Tackifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

The ink may also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-M-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetramethyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10, 515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino) benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof. When present, the optional UV absorber may be present in the ink in any desired or effective amount, such as from about 1 percent to about 10 percent by weight of the ink or from about 3 percent to about 5 percent by weight of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.) and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

The ink may also contain one or more dispersants and/or one or more surfactants for their known properties, such as controlling wetting properties of the ink composition, and stabilizing pigments. Examples of suitable additives that may be used in embodiments include, but are not limited to, BYK-UV 3500, BYK-UV 3510 (BYK-Chemie); Dow Corning 18, 27, 57, 67 Additives; ZONYL FSO 100 (DuPont); MODA-FLOW 2100 (Solutia); Foam Blast 20F, 30, 550 (Lubrizol); EFKA-1101, 4046, -4047, -2025, -2035, -2040, -2021, -3600, -3232; SOLSPERSE 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries).

When present, the optional additives may each, or in combination, be present in the ink in any desired or effective amount, such as from about 1 percent to about 10 percent by weight of the ink or from about 3 percent to about 5 percent by weight of the ink.

In embodiments, the ink compositions described herein also includes at least one colorant. Any desired or effective colorant can be employed in the ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The ink compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN(Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 8,221,137, the disclosure of which is totally incorporated herein by reference, and the like. Polymeric dyes can also be used, such as those disclosed in, for example, U.S. Pat. No. 5,621,022 and 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the ink composition described herein. Pigments are generally more hydrophilic than dyes. This hydrophilic nature may make it possible to incorporate a polyhydroxyalkanoate compound into the ink such that the attributes associated with the polyhydroxyalkanoate compound (for example, increased adhesion and enhanced cohesion) become evident.

Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degussa) Carbon Black 5250 and Carbon Black 5750 (commercially available from Columbia Chemical), and the like, as well as mixtures thereof.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The amount of colorant in the phase change ink of the present disclosure, whether in the core, the shell, or both, may be from 0.5% to about 20% by weight of the ink vehicle or ink vehicle mixture, in embodiments from about 1% to about 10% by weight, or from about 4% to about 8% by weight of the ink vehicle or ink vehicle mixture.

In embodiments, the ink carriers for the phase change inks may have melting points of from about 60 to about 150° C., for example from about 80 to about 120° C., from about 85 to about 110° C., from about 100 to about 110° C., or from about 105 to about 110° C. as determined by, for example, observation and measurement on a microscope hot stage, wherein the binder material is heated on a glass slide and observed by microscope. Higher melting points are also acceptable, although printhead life may be reduced at temperatures higher than 150° C. Furthermore, low energy inks have a jetting viscosity of about 9 to about 13 cP, such as from about 10 to about 11 cP, from about 10.25 to about 10.75 cP or from about 10.45 to about 10.85 cP, at jetting temperatures of about 107 to about 111° C., although the viscosity and temperature values can be outside theses ranges.

The ink compositions can be prepared by any desired or suitable method. For example, each of the components of the ink carrier can be mixed together, followed by heating, the mixture to at least its melting point, for example from about 60 to about 150° C., 80 to about 120° C. and 85 to about 110° C. The colorant may be added before the ink ingredients have been heated or after the ink ingredients have been heated. The molten mixture may be subjected to grinding in an attritor or ball mill apparatus to effect dispersion of the colorant in the ink carrier. The heated mixture is then stirred for about 5 seconds to about 10 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in an apparatus for direct printing ink jet processes and in indirect (offset) printing ink jet applications. Examples of apparatuses that are suitable for printing the phase change inks described herein include apparatuses comprised of at least one ink retaining reservoir to store or hold phase change ink, an ink jet head for printing the ink, and an ink supply line for providing the phase change ink to the ink jet head.

Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable Substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

EXAMPLES

Example 1a

Preparation of Pigmented Polar Concentrate Ink

A mixture comprised of (a) 19.11 parts KE-100 resin (triglycerides of hydrogenated abietic (rosin) acid from Arakawa Chemical Industries Ltd.), (b) 0.25 parts NAUGARD N445 antioxidant from Crompton Corp, (c) 91.10 parts UNILIN 425 (a high molecular weight linear alcohol (commercially available from Baker Petrolite)), (d) 12.23 parts of KEMAMIDE E-180 (a stearyl erucamide available from Chemtura Corporation), (e) 12.27 parts of SOLSPERSE 13240 dispersant (available from Lubrizol) and (f) 0.04 parts of SOLSPERSE 5000 synergist (available from Lubrizol) was heated to 120° C. and charged into a Szegvari 01 Attritor equipped with one-eighth inch steel balls. To this mixture, 15 parts of HOSTAPERM Blue B4-G (available from Clariant Corporation) was slowly added and allowed to attrite overnight for 18 hours at 250 rpm.

Example 1b

Preparation of a Polar Ink Incorporating the Biologically Derived Resin (Polyhydroxyalkanoate)

8 parts of the pigmented polar concentrate ink described above in EXAMPLE 1a was added to a 100 mL beaker. A stirrer bar was placed inside of the beaker and the beaker was placed on a heated stirrer hot plate set to 120° C. To the stirred concentration, a pre-mixed homogenous solution was added. The homogenous solution was comprised of 4 parts of poly (3-hydroxyheptoate-co-3-hydroxynonoate (a bacterially-derived polyhydroxyalkanoate obtained from Polyferm Canada, Inc.), 4.48 parts KE-100, 22.40 parts UNILIN 425, 3.20 parts E-180 and 0.08 parts NAUGARD 445. After two hours stirring, the newly formed ink was filtered through a 1 micron filter. The filtered ink was poured into flat disc molds and long rod molds, and allowed to cool for 1 hour. Upon being subjected to lateral stresses by hand against their shapes, the shapes flexed without breaking and did not shatter. See FIGS. 1 and 2. The rheology of the ink, determined using an RFS-3 rheometer from Rheometrics Scientific (now TA Instruments) by cone and plate method where the shear rate viscosity at 115° C. and 100 s$^{-1}$ shear rate was 14.4 cP.

Comparative Example 1

Preparation of a Pigmented Ink Without the Biologically Derived Resin 8 parts of the pigmented polar concentrate ink described above in EXAMPLE 1a was added to a 100 mL beaker. A stirrer bar was placed inside of the beaker and the beaker was placed on a heated stirrer hot plate set to 120° C. To the stirred concentration a pre-mixed homogenous solution was added. The homogenous solution was comprised of 4.56 parts KE-100, 22.78 parts UNILIN 425, 3.25 parts E-180 and 0.08 parts NAUGARD 445, and did not contain any polyhydroxyalkanoate resin. After two hours stirring, the newly formed ink was filtered through a 1 micron filter. The filtered ink was poured into flat disc molds and long rod molds, and allowed to cool for 1 hour. Upon being subjected to same lateral stresses by hand against their shapes as Example 1b, the shapes flexed somewhat before being subsequently shattered or broken. The rheology of the ink, determined using an RFS-3 rheometer from Rheometrics Scientific (now TA Instruments) by cone and plate method, where the shear rate viscosity at 115° C. and 100 s$^{-1}$ shear rate was 9.9 cP.

Comparative Example 2

Preparation of a Pigmented Ink Without the Biologically Derived Resin

Another ink was prepared from the concentrate formed in Example 1a such that the total amount of KE-100 in this example was increased. 8 parts of the pigmented polar concentrate ink described above in EXAMPLE 1a was added to a 100 mL beaker. A stirrer bar was placed inside of the beaker and the beaker was placed on a heated stirrer hot plate set to 120° C. To the stirred concentration a pre-mixed homogenous solution was added. The homogenous solution was comprised of 6.48 parts KE-100, 22.40 parts UNILIN 425, 3.20 parts E-180 and 0.08 parts NAUGARD 445. After two hours stirring, the newly formed ink was filtered through a 1 micron filter. The filtered ink was poured into flat disc molds and long rod molds, and allowed to cool for 1 hour. Upon being subjected to same lateral stresses by hand against their shapes as Example 1b, the shapes flexed somewhat before being subsequently shattered, or broken. The rheology of the ink, determined using an RFS-3 rheometer from Rheometrics Scientific (now TA Instruments) by cone and plate method, where the shear rate viscosity at 115° C. and 100 s$^{-1}$ shear rate was 10.5 cP.

Comparative Example 3

Preparation of a Cyan Dye Ink Without the Biologically Derived Resin

An ink base was prepared by mixing the following components by melting and homogeneously blended them together at 120° C. using an overhead stirrer: 50.17 grams of a distilled polyethylene wax from Baker Petrolite, 13.95 parts by weight triamide wax (the triamide wax described in U.S. Pat. No. 6,860,930, which is incorporated by reference in its entirety), 15.14 parts by weight S-180, 12.42 parts by weight KE-100 resin, 4.42 parts by weight of a urethane resin that is the adduct of three equivalents of stearyl isocyanate and a glycerol-based alcohol, prepared as described in Example 4 of U.S. Pat. No. 6,309,453, the disclosure of which is totally incorporated herein by reference, and 0.17 parts by weight NAUGUARD 445.

To this prepared solution were added 3.55 grams of a cyan colorant. After two hours stirring, the newly formed ink was filtered through a 1 micron filter. The filtered ink was poured into flat disc molds and long rod molds, and allowed to cool for 1 hour. Upon being subjected to same lateral stresses by hand against their shapes as Example 1b, the shapes flexed somewhat before being subsequently shattered or broken. The rheology of the ink, determined using an RFS-3 rheometer from Rheometrics Scientific (now TA Instruments) by cone and plate method where the shear rate viscosity at 115° C. and 100 s$^{-1}$ shear rate was 9.5 cP.

Comparative Example 4

Preparation of a Polar Yellow Dye Ink Without the Biologically Derived Resin

A polar ink containing a yellow dye proprietary to Xerox Corporation was prepared in the following manner. To a 600 mL beaker were added 14.95 parts KE-100, 71.09 parts UNILIN 425, 9.97 parts E-180 and 0.19 parts NAUGARD 445 where the solution was allowed to melt at 120° C. for 3 hours upon which it was gently stirred by mechanical stirring for a 30 minutes to effect solution. To the stirring solution were added 3.79 parts of a Xerox custom yellow dye whereby the newly formed ink was allowed to continue to stir for 2 hours. The ink was filtered past a 1 micron filter available from Parker-Hannefin Corporation. The melted ink was then poured into flat disc molds and long rod molds. After about 1 hour, the ink shapes were removed from the molds and subjected to the same lateral stresses by hand against their shapes as in Example 1b. The shapes did not flex at all and were subsequently shattered or broken.

Stress and Flexibility Test

As a relative comparison of the load stress (toughness) and flexibility of incorporating a polyhydroxyalkanoate in a solid ink composition, inks having the composition described above in Example 1b, Comparative Example 1 and Comparative Example 2 were melted and poured into a silicone mold in an oven having a temperature of 120° C. The ink compositions herein may have a breaking point of about 6,000 grams force per centimeter to about 10,000 grams form per centimeter, from about 6,500 grams force per centimeter to about 9,000 grams form per centimeter and from 6,500 grams force per centimeter to about 8,750 grams form per centimeter.

The Mold containing the ink (molded ink sample) was removed and allowed to cool under ambient conditions. Each of the molded ink samples prepared had a symmetrical I-shaped geometry having the following adjacent perimeter dimensions in millimeters (mm): 24+24+24+12+12+12+24+24+24+12+12+12. The thickness of the samples was allowed to vary from about 2 to about 2.5 mm and was determined using an MT 60M thickness gauge from Heidenhain Corporation. Two replicates for each of the three solid ink compositions were poured to assess the repeatability and dependence of fracture resistance on sample thickness. All of the molded ink samples were aged 5 days under ambient conditions, typically 24° C., 50% relative humidity, before being subjected to a manual stress test performed in the following manner.

The manual stress test began by attaching one of the molded ink samples to an Ohaus weighing scale, with limit of 4.1 kg load, the Ohaus weighing scale having an 8 mm diameter steel rod affixed to two 50 mm high plastic supports. The molded ink sample was manually held horizontally in place over the rod whereupon a load was gradually applied, typically 50 to 70 grams/second, with the grams of force, normal to the sample, applied over time being recorded by computer via RS-232 interface in 500 ms intervals. Table 1 summarizes the applied force, given in units of grams force per centimeter, necessary to induce the ink samples to break.

TABLE 1

| Ink Sample Breaking Point | | | | | |
|---|---|---|---|---|---|
| Sample Thickness Target | Sample Thickness (mm) | Breaking Point of Example 1b (gm · F/cm) | Breaking Point of Comparative Example 1 (gm · F/cm) | Breaking Point of Comparative Example 2 (gm · F/cm) | Breaking Point of Comparative Example 3 (gm · F/cm) |
| high | 2.69 | 6641 | — | — | — |
| high | 2.89 | 6804 | — | — | — |
| low | 1.85 | 8036 | — | — | — |
| low | 1.89 | 8679 | — | — | — |
| high | 2.58 | — | 1407 | — | — |

TABLE 1-continued

Ink Sample Breaking Point

| Sample Thickness Target | Sample Thickness (mm) | Breaking Point of Example 1b (gm · F/cm) | Breaking Point of Comparative Example 1 (gm · F/cm) | Breaking Point of Comparative Example 2 (gm · F/cm) | Breaking Point of Comparative Example 3 (gm · F/cm) |
|---|---|---|---|---|---|
| high | 2.37 | — | 1014 | — | — |
| low | 2.30 | — | 862 | — | — |
| low | 2.12 | — | 728 | — | — |
| high | 2.46 | — | — | 897 | — |
| high | 2.45 | — | — | 767 | — |
| low | 1.81 | — | — | 1473 | — |
| low | 2.28 | — | — | 1149 | — |
| high | 2.44 | — | — | — | 1437 |
| high | 2.42 | — | — | — | 1519 |
| low | 1.84 | — | — | — | 863 |
| low | 1.82 | — | — | — | 854 |

Table 2 summarizes the applied force, given as grams force per centimeter, necessary to induce the ink samples to break, for normalized sample thicknesses of 2.0 and 2.5 mm as calculated using a linear interpolation of the results in Table 1.

TABLE 2

Ink Sample Breaking Point With Applied Force Normalized to Constant Sample Thickness (grams force per centimeter)

| Thickness (mm) | Breaking Point Ex. 1b | Breaking Point Comp. Ex. 1 | Breaking Point Comp. Ex. 2 | Breaking Point Comp. Ex. 3 | Breaking Point Factor Increase Over Comp. Ex. 1 | Breaking Point Factor Increase Over Comp. Ex. 2 | Breaking Point Factor Increase Over Comp. Ex. 3 |
|---|---|---|---|---|---|---|---|
| 2 | 8101 | 484 | 1314 | 1067 | 16.7 | 6.2 | 7.6 |
| 2.5 | 7250 | 1243 | 824 | 1650 | 5.8 | 8.8 | 4.4 |

The results clearly demonstrate an unexpected improvement in the robustness and toughness of the ink samples made with the polyhydroxyalkanoate bioresin from Example 1b) such that the factor increase in breaking force of the ink over the pigmented ink containing no polyhydroxyalkanoate resin from Comparative Example 1 was between about 6 to about 17 times depending on the sample thickness. The factor increase in breaking force of the ink samples made with the PHA bioresin from Example 1b) over the pigmentless ink containing no PHA bioresin from Comparative Example 3 was between about 4 to about 8 times depending on the sample thickness.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A solid phase change ink composition comprising at least one colorant, and an ink vehicle including at least one (3-hydroxyheptanoate)-(3-hydroxynonanoate) copolymer.

2. The solid phase change ink composition of claim 1, wherein the (3 hydroxyheptanoate)-(3-hydroxynonanoate) copolymer is present in the ink vehicle in an amount of at least 0.5 percent by weight of the ink vehicle to about 20 percent by weight of the ink vehicle.

3. The solid phase change ink composition of claim 1, wherein the ink vehicle further comprises at least one branched triamide, a monoamide and an isocyanate derived material.

4. The solid phase change ink composition of claim 3, wherein the branched triamide is present in the ink in an amount of at least 2 to about 50% by weight of the ink vehicle.

5. The solid phase change ink composition of claim 3, wherein the monoamide is a stearyl stearamide present in the ink in an amount of at least about 2 to about 90% by weight of the ink.

6. The solid phase change ink composition of claim 3, wherein the isocyanate derived material is a urethane resin obtained from the reaction of two equivalents of hydroabietyl alcohol and one equivalent of isophorone diisocyanate and is present in the ink in an amount of at least about 2% by weight of the ink vehicle.

7. A solid phase change ink composition comprising at least one colorant, and an ink vehicle including at least one branched triamide, a monoamide, an isocyanate derived material, a triglyceride of hydrogenated abietic acid and at least a (3-hydroxyheptanoate)-(3-hydroxynonanoate) copolymer.

8. The solid phase change ink composition of claim 7, wherein the (3 hydroxyheptanoate)-(3-hydroxynonanoate) copolymer is present in the ink vehicle in an amount of at least 0.5 percent by weight of the ink vehicle to about 20 percent by weight of the ink vehicle.

9. The solid phase change ink composition of claim 7, wherein the branched triamide is present in the ink in an amount of at least 2 to about 50% by weight of the ink vehicle.

10. The solid phase change ink composition of claim 7, wherein the monoamide is a stearyl stearamide present in the ink in an amount of at least about 2 to about 90% by weight of the ink.

11. The solid phase change ink composition of claim 7, wherein the isocyanate derived material is a urethane resin obtained from the reaction of two equivalents of hydroabietyl alcohol and one equivalent of isophorone diisocyanate and is present in the ink in an amount of at least about 2% by weight of the ink vehicle.

12. An ink jet device comprising at least one ink retaining reservoir holding a phase change ink, an ink jet head, and an ink supply line for providing the phase change ink to the ink jet head, wherein the phase change ink comprises at least one colorant and an ink vehicle including at least a (3-hydroxyheptanoate)-(3-hydroxynonanoate) copolymer.

13. The ink jet device of claim 12, wherein the ink vehicle further comprises at least one branched triamide, a monoamide, an isocyanate derived material, and a triglyceride of hydrogenated abietic acid.

* * * * *